(12) United States Patent
Wood et al.

(10) Patent No.: US 8,625,642 B2
(45) Date of Patent: Jan. 7, 2014

(54) METHOD AND APPARATUS OF NETWORK ARTIFACT INDENTIFICATION AND EXTRACTION

(75) Inventors: Matthew Scott Wood, Salt Lake City, UT (US); Paal Tveit, Salt Lake City, UT (US); Brian Edginton, West Jordan, UT (US); Steve Shillingford, Lindon, UT (US); James Brown, Lindon, UT (US)

(73) Assignee: Solera Networks, Inc., South Jordan, UT (US)

( * ) Notice: Subject to any disclaimer, the term of this patent is extended or adjusted under 35 U.S.C. 154(b) by 286 days.

(21) Appl. No.: 12/126,551

(22) Filed: May 23, 2008

(65) Prior Publication Data

US 2009/0290580 A1    Nov. 26, 2009

(51) Int. Cl.
*H04L 12/66* (2006.01)

(52) U.S. Cl.
USPC .................. 370/529; 726/22; 726/23; 726/29

(58) Field of Classification Search
USPC .................................. 370/529; 726/22, 23, 29
See application file for complete search history.

(56) References Cited

U.S. PATENT DOCUMENTS

| | | | |
|---|---|---|---|
| 5,274,643 A | 12/1993 | Fisk | |
| 5,440,719 A | 8/1995 | Hanes et al. | |
| 5,526,283 A | 6/1996 | Hershey et al. | |
| 5,602,830 A | 2/1997 | Fichou et al. | |
| 5,758,178 A | 5/1998 | Lesartre | |
| 6,041,053 A | 3/2000 | Douceur et al. | |
| 6,101,543 A | 8/2000 | Alden et al. | |
| 6,145,108 A | 11/2000 | Ketseoglou | |
| 6,185,568 B1 | 2/2001 | Douceur et al. | |
| 6,336,117 B1 | 1/2002 | Massarani | |
| 6,370,622 B1 | 4/2002 | Chiou et al. | |
| 6,400,681 B1 | 6/2002 | Bertin et al. | |
| 6,453,345 B2 | 9/2002 | Trcka et al. | |

(Continued)

FOREIGN PATENT DOCUMENTS

| EP | 0838930 | 4/1998 |
|---|---|---|
| EP | 1004185 | 5/2000 |

(Continued)

OTHER PUBLICATIONS

International Search Report and Written Opinion, PCT/US2009/041061, dated Nov. 26, 2009.

(Continued)

*Primary Examiner* — Un C Cho
*Assistant Examiner* — Siming Liu
(74) *Attorney, Agent, or Firm* — Cooley LLP

(57) ABSTRACT

A method, system, and apparatus of network artifact identification and extraction are disclosed. In one embodiment, a method includes aggregating a payload data (e.g., may be a component of the extracted artifact) from different network packets to form an aggregated payload data, matching the payload data with an entry of a library of known artifacts, determining a type of the payload data based on a match with the entry of the library of known artifacts, separating the payload data from a header data in a network packet, and communicating the aggregated payload data as an extracted artifact to a user. The method may include using the extracted artifact to perform network visibility analysis of users on packets flowing across the network. The method may validate that the entry is accurate by performing a deeper analysis of the payload data with the entry of the library of known artifacts.

8 Claims, 10 Drawing Sheets

(56) References Cited

U.S. PATENT DOCUMENTS

| | | |
|---|---|---|
| 6,516,380 B2 | 2/2003 | Kenchammana-Hoskote et al. |
| 6,522,629 B1 | 2/2003 | Anderson, Sr. |
| 6,591,299 B2 | 7/2003 | Riddle et al. |
| 6,628,617 B1 | 9/2003 | Karol et al. |
| 6,628,652 B1 | 9/2003 | Chrin et al. |
| 6,631,380 B1 | 10/2003 | Cason et al. |
| 6,675,218 B1 | 1/2004 | Mahler et al. |
| 6,693,909 B1 | 2/2004 | Mo et al. |
| 6,708,292 B1 | 3/2004 | Mangasarian |
| 6,754,202 B1 | 6/2004 | Sun et al. |
| 6,782,444 B1 | 8/2004 | Vishlitzky et al. |
| 6,789,125 B1 | 9/2004 | Aviani et al. |
| 6,907,468 B1 | 6/2005 | Moberg et al. |
| 6,907,520 B2 | 6/2005 | Parady |
| 6,928,471 B2 | 8/2005 | Pabari et al. |
| 6,956,820 B2 | 10/2005 | Zhu et al. |
| 6,958,998 B2 | 10/2005 | Shorey |
| 6,993,037 B2 | 1/2006 | Boden et al. |
| 6,999,454 B1 | 2/2006 | Crump |
| 7,002,926 B1 | 2/2006 | Eneboe et al. |
| 7,024,609 B2 | 4/2006 | Wolfgang et al. |
| 7,028,335 B1 | 4/2006 | Borella et al. |
| 7,032,242 B1 | 4/2006 | Grabelsky et al. |
| 7,039,018 B2 | 5/2006 | Singh et al. |
| 7,047,297 B2 | 5/2006 | Huntington et al. |
| 7,058,015 B1 | 6/2006 | Wetherall et al. |
| 7,061,874 B2 | 6/2006 | Merugu et al. |
| 7,065,482 B2 | 6/2006 | Shorey et al. |
| 7,072,296 B2 | 7/2006 | Turner et al. |
| 7,075,927 B2 | 7/2006 | Mo et al. |
| 7,116,643 B2 | 10/2006 | Huang et al. |
| 7,126,944 B2 | 10/2006 | Rangarajan et al. |
| 7,126,954 B2 | 10/2006 | Fang et al. |
| 7,142,507 B1 | 11/2006 | Kurimoto et al. |
| 7,145,906 B2 | 12/2006 | Fenner |
| 7,151,751 B2 | 12/2006 | Tagami et al. |
| 7,154,896 B1 | 12/2006 | Kim et al. |
| 7,162,649 B1 | 1/2007 | Ide et al. |
| 7,168,078 B2 | 1/2007 | Bar et al. |
| 7,200,122 B2 | 4/2007 | Goringe et al. |
| 7,203,173 B2 | 4/2007 | Bonney et al. |
| 7,218,632 B1 | 5/2007 | Bechtolsheim et al. |
| 7,237,264 B1 | 6/2007 | Graham et al. |
| 7,240,166 B2 | 7/2007 | Ganfield |
| 7,254,562 B2 | 8/2007 | Hsu et al. |
| 7,269,171 B2 | 9/2007 | Poon et al. |
| 7,274,691 B2 | 9/2007 | Rogers et al. |
| 7,277,399 B1 | 10/2007 | Hughes, Jr. |
| 7,283,478 B2 | 10/2007 | Barsheshet et al. |
| 7,292,591 B2 | 11/2007 | Parker et al. |
| 7,330,888 B2 | 2/2008 | Storry et al. |
| 7,340,776 B2 | 3/2008 | Zobel et al. |
| 7,359,930 B2 | 4/2008 | Jackson et al. |
| 7,376,731 B2 | 5/2008 | Khan et al. |
| 7,376,969 B1 | 5/2008 | Njemanze et al. |
| 7,379,426 B2 | 5/2008 | Sekiguchi |
| 7,385,924 B1 * | 6/2008 | Riddle ............ 370/235 |
| 7,386,473 B2 | 6/2008 | Blumenau |
| 7,391,769 B2 | 6/2008 | Rajkumar et al. |
| 7,406,516 B2 | 7/2008 | Davis et al. |
| 7,408,938 B1 | 8/2008 | Chou et al. |
| 7,418,006 B2 | 8/2008 | Damphier et al. |
| 7,420,992 B1 | 9/2008 | Fang et al. |
| 7,423,979 B2 | 9/2008 | Martin |
| 7,433,326 B2 | 10/2008 | Desai et al. |
| 7,440,464 B2 | 10/2008 | Kovacs |
| 7,441,267 B1 | 10/2008 | Elliott |
| 7,444,679 B2 | 10/2008 | Tarquini et al. |
| 7,450,560 B1 | 11/2008 | Grabelsky et al. |
| 7,450,937 B1 | 11/2008 | Claudatos et al. |
| 7,453,804 B1 | 11/2008 | Feroz et al. |
| 7,457,277 B1 | 11/2008 | Sharma et al. |
| 7,457,296 B2 | 11/2008 | Kounavis et al. |
| 7,457,870 B1 | 11/2008 | Lownsbrough et al. |
| 7,466,694 B2 | 12/2008 | Xu et al. |
| 7,467,202 B2 | 12/2008 | Savchuk |
| 7,480,238 B2 | 1/2009 | Funk et al. |
| 7,480,255 B2 | 1/2009 | Bettink |
| 7,483,424 B2 | 1/2009 | Jain et al. |
| 7,496,036 B2 | 2/2009 | Olshefski |
| 7,496,097 B2 | 2/2009 | Rao et al. |
| 7,499,590 B2 | 3/2009 | Seeber |
| 7,508,764 B2 | 3/2009 | Back et al. |
| 7,512,078 B2 | 3/2009 | Swain et al. |
| 7,512,081 B2 | 3/2009 | Ayyagari et al. |
| 7,522,521 B2 | 4/2009 | Bettink et al. |
| 7,522,594 B2 | 4/2009 | Piche et al. |
| 7,522,599 B1 | 4/2009 | Aggarwal et al. |
| 7,522,604 B2 | 4/2009 | Hussain et al. |
| 7,522,605 B2 | 4/2009 | Spencer et al. |
| 7,522,613 B2 | 4/2009 | Rotsten et al. |
| 7,525,910 B2 | 4/2009 | Wen |
| 7,525,963 B2 | 4/2009 | Su et al. |
| 7,526,795 B2 | 4/2009 | Rollins |
| 7,529,196 B2 | 5/2009 | Basu et al. |
| 7,529,242 B1 | 5/2009 | Lyle |
| 7,529,276 B1 | 5/2009 | Ramakrishnan |
| 7,529,932 B1 | 5/2009 | Haustein et al. |
| 7,529,939 B2 | 5/2009 | Bruwer |
| 7,532,623 B2 | 5/2009 | Rosenzweig et al. |
| 7,532,624 B2 | 5/2009 | Ikegami et al. |
| 7,532,633 B2 | 5/2009 | Rijsman |
| 7,532,726 B2 | 5/2009 | Fukuoka et al. |
| 7,533,256 B2 | 5/2009 | Walter et al. |
| 7,533,267 B2 | 5/2009 | Yoshimura |
| 7,548,562 B2 | 6/2009 | Ward et al. |
| 7,561,569 B2 | 7/2009 | Thiede |
| 7,617,314 B1 | 11/2009 | Bansod et al. |
| 7,684,347 B2 | 3/2010 | Merkey et al. |
| 7,694,022 B2 * | 4/2010 | Garms et al. ............ 709/249 |
| 7,730,011 B1 | 6/2010 | Deninger et al. |
| 7,792,818 B2 | 9/2010 | Fain et al. |
| 7,853,564 B2 | 12/2010 | Mierau et al. |
| 7,855,974 B2 | 12/2010 | Merkey et al. |
| 7,881,291 B2 | 2/2011 | Grah |
| 7,904,726 B2 | 3/2011 | Elgezabal |
| 8,068,431 B2 | 11/2011 | Varadarajan et al. |
| 2001/0039579 A1 | 11/2001 | Trcka et al. |
| 2002/0085507 A1 | 7/2002 | Ku et al. |
| 2002/0089937 A1 | 7/2002 | Venkatachary et al. |
| 2002/0091915 A1 | 7/2002 | Parady |
| 2002/0138654 A1 | 9/2002 | Liu et al. |
| 2002/0173857 A1 | 11/2002 | Pabari et al. |
| 2002/0191549 A1 * | 12/2002 | McKinley et al. ............ 370/254 |
| 2003/0009718 A1 | 1/2003 | Wolfgang et al. |
| 2003/0014517 A1 * | 1/2003 | Lindsay et al. ............ 709/224 |
| 2003/0028662 A1 | 2/2003 | Rowley et al. |
| 2003/0088788 A1 | 5/2003 | Yang |
| 2003/0135525 A1 | 7/2003 | Huntington |
| 2003/0135612 A1 | 7/2003 | Huntington |
| 2003/0188106 A1 | 10/2003 | Cohen |
| 2003/0214913 A1 | 11/2003 | Kan et al. |
| 2003/0221003 A1 | 11/2003 | Storry et al. |
| 2003/0231632 A1 | 12/2003 | Haeberlen |
| 2003/0233455 A1 * | 12/2003 | Leber et al. ............ 709/226 |
| 2004/0010473 A1 | 1/2004 | Hsu et al. |
| 2004/0078292 A1 | 4/2004 | Blumenau |
| 2004/0100952 A1 | 5/2004 | Boucher et al. |
| 2004/0103211 A1 | 5/2004 | Jackson et al. |
| 2004/0218631 A1 | 11/2004 | Ganfield |
| 2004/0260682 A1 | 12/2004 | Herley et al. |
| 2005/0015547 A1 | 1/2005 | Yokohata et al. |
| 2005/0050028 A1 | 3/2005 | Rose et al. |
| 2005/0055399 A1 | 3/2005 | Savchuk |
| 2005/0063320 A1 | 3/2005 | Klotz et al. |
| 2005/0083844 A1 | 4/2005 | Zhu et al. |
| 2005/0108573 A1 * | 5/2005 | Bennett et al. ............ 713/201 |
| 2005/0117513 A1 | 6/2005 | Park et al. |
| 2005/0132046 A1 | 6/2005 | de la Iglesia et al. |
| 2005/0132079 A1 | 6/2005 | Iglesia et al. |
| 2005/0207412 A1 | 9/2005 | Kawashima et al. |
| 2005/0229255 A1 | 10/2005 | Gula et al. |
| 2005/0249125 A1 | 11/2005 | Yoon et al. |
| 2005/0265248 A1 | 12/2005 | Gallatin et al. |

(56) References Cited

U.S. PATENT DOCUMENTS

| | | |
|---|---|---|
| 2006/0013222 A1 | 1/2006 | Rangan et al. |
| 2006/0037072 A1 | 2/2006 | Rao et al. |
| 2006/0069821 A1 | 3/2006 | P et al. |
| 2006/0083180 A1 | 4/2006 | Baba et al. |
| 2006/0088040 A1 | 4/2006 | Kramer et al. |
| 2006/0114842 A1 | 6/2006 | Miyamoto et al. |
| 2006/0126665 A1 | 6/2006 | Ward et al. |
| 2006/0146816 A1 | 7/2006 | Jain |
| 2006/0165009 A1 | 7/2006 | Nguyen et al. |
| 2006/0165052 A1 | 7/2006 | Dini et al. |
| 2006/0167894 A1 | 7/2006 | Wunner |
| 2006/0168240 A1 | 7/2006 | Olshefski |
| 2006/0203848 A1 | 9/2006 | Damphier et al. |
| 2006/0221967 A1 | 10/2006 | Narayan et al. |
| 2006/0233118 A1 | 10/2006 | Funk et al. |
| 2006/0235908 A1 | 10/2006 | Armangau et al. |
| 2007/0019640 A1 | 1/2007 | Thiede |
| 2007/0036156 A1 | 2/2007 | Liu et al. |
| 2007/0038665 A1 | 2/2007 | Kwak et al. |
| 2007/0050334 A1 | 3/2007 | Deninger et al. |
| 2007/0050465 A1 | 3/2007 | Canter et al. |
| 2007/0058631 A1 | 3/2007 | Mortier et al. |
| 2007/0078802 A1 | 4/2007 | Bestgen et al. |
| 2007/0124276 A1 | 5/2007 | Weissman et al. |
| 2007/0139231 A1* | 6/2007 | Wallia et al. ............ 341/50 |
| 2007/0140235 A1 | 6/2007 | Aysan et al. |
| 2007/0140295 A1 | 6/2007 | Akaboshi |
| 2007/0147263 A1 | 6/2007 | Liao et al. |
| 2007/0153796 A1 | 7/2007 | Kesavan et al. |
| 2007/0157306 A1 | 7/2007 | Elrod et al. |
| 2007/0162609 A1 | 7/2007 | Pope et al. |
| 2007/0162971 A1 | 7/2007 | Blom et al. |
| 2007/0204033 A1 | 8/2007 | Bookbinder et al. |
| 2007/0223474 A1 | 9/2007 | Shankar |
| 2007/0248029 A1 | 10/2007 | Merkey et al. |
| 2007/0250817 A1 | 10/2007 | Boney |
| 2007/0271372 A1 | 11/2007 | Deninger et al. |
| 2007/0286175 A1 | 12/2007 | Xu et al. |
| 2007/0291755 A1 | 12/2007 | Cheng et al. |
| 2007/0291757 A1 | 12/2007 | Dobson et al. |
| 2007/0297349 A1 | 12/2007 | Arkin |
| 2008/0013541 A1 | 1/2008 | Calvignac et al. |
| 2008/0037539 A1 | 2/2008 | Paramaguru |
| 2008/0056144 A1 | 3/2008 | Hutchinson et al. |
| 2008/0117903 A1 | 5/2008 | Uysal |
| 2008/0159146 A1* | 7/2008 | Claudatos et al. ............ 370/235 |
| 2008/0175167 A1 | 7/2008 | Satyanarayanan et al. |
| 2008/0181245 A1 | 7/2008 | Basso et al. |
| 2008/0240128 A1 | 10/2008 | Elrod |
| 2008/0247313 A1 | 10/2008 | Nath et al. |
| 2008/0279216 A1 | 11/2008 | Sharif-Ahmadi et al. |
| 2008/0294647 A1 | 11/2008 | Ramaswamy |
| 2009/0003363 A1 | 1/2009 | Benco et al. |
| 2009/0006672 A1 | 1/2009 | Blumrich et al. |
| 2009/0028161 A1 | 1/2009 | Fullarton et al. |
| 2009/0028169 A1 | 1/2009 | Bear et al. |
| 2009/0041039 A1 | 2/2009 | Bear et al. |
| 2009/0073895 A1 | 3/2009 | Morgan et al. |
| 2009/0092057 A1 | 4/2009 | Doctor et al. |
| 2009/0097417 A1 | 4/2009 | Asati et al. |
| 2009/0097418 A1 | 4/2009 | Castillo et al. |
| 2009/0103531 A1 | 4/2009 | Katis et al. |
| 2009/0109875 A1 | 4/2009 | Kaneda et al. |
| 2009/0113217 A1 | 4/2009 | Dolgunov et al. |
| 2009/0116403 A1 | 5/2009 | Callanan et al. |
| 2009/0116470 A1 | 5/2009 | Berggren |
| 2009/0119501 A1 | 5/2009 | Petersen |
| 2009/0122801 A1 | 5/2009 | Chang |
| 2009/0168648 A1 | 7/2009 | Labovitz et al. |
| 2009/0182953 A1 | 7/2009 | Merkey et al. |
| 2009/0187558 A1 | 7/2009 | McDonald |
| 2009/0219829 A1 | 9/2009 | Merkey et al. |
| 2009/0245114 A1 | 10/2009 | Vijayaraghavan |
| 2009/0290580 A1 | 11/2009 | Wood et al. |
| 2009/0292681 A1 | 11/2009 | Wood et al. |
| 2010/0278052 A1 | 11/2010 | Matityahu et al. |

FOREIGN PATENT DOCUMENTS

| | | |
|---|---|---|
| EP | 1387527 | 2/2004 |
| EP | 1494425 A1 | 1/2005 |
| EP | 1715627 | 10/2006 |
| EP | 1971087 | 9/2008 |
| GB | 2337903 | 12/1999 |
| JP | 2002026935 | 1/2002 |
| JP | 2002064507 | 2/2002 |
| JP | 2002323959 | 11/2002 |
| KR | 1020060034581 A | 4/2006 |
| WO | WO 02/23805 | 3/2002 |
| WO | WO 2005/109754 | 11/2005 |
| WO | WO 2009/038384 | 3/2009 |

OTHER PUBLICATIONS

Berners-Lee et al., "Hypertext Transfer Protocol—HTTP/1.0", IETF, RFC 1945, Network Working Group, 1996, 60 pgs.

Fielding et al., "Hypertext Transfer Protocol—HTTP/1.1", Internet Engineering task Force (IETF), Request for Comments (RFC) 2616, 2068, Netowrk Working Group, 1999, 165 pgs.

Hamill et al., "Petaminer: Efficient Navigation to Petascale Data Using Event-Level Metadata", Proceedings of XII Advanced Computing and Analysis Techniques in Physics Research, Nov. 2008, pp. 1-5.

Huang et al., PlanetFlow: Maintaining Accountability for Network Services, ACM SIGOPS Operating Systems Review 40, 1 (Jan. 2006), 6 pgs.

International Search Report issued to application No. PCT/US09/41060, Dec. 3, 2009, 8 pgs.

International Search Report issued to application No. PCT/US09/40733, Nov. 24, 2009, 3 pgs.

International Search Report issued to application No. PCT/US10/56739, Apr. 1, 2011, 15 pgs.

International Search Report issued to application No. PCT/US10/56723, Apr. 20, 2011, 14 pgs.

Stockinger, "Network Traffic Analysis with Query Driven Visualization—SC2005 HPC Analytics Results", Proceedings of the 2005 ACM/IEEE SC/05 Conference, Nov. 2005, 4 pgs.

\* cited by examiner

| ARTIFACT 302 | START BITS 304 | LENGTH 306 | END BITS 308 | ENCRYPTED 310 | OTHER 312 |
|---|---|---|---|---|---|
| WORD PROCESSING DOC | 4 BITS<br>1011 | 2 BITS<br>16 | 4 BITS<br>1001 | YES | REPEATS EVERY TWO INTERVALS |
| SPREAD SHEET FILE | 3 BITS<br>110 | 24 BITS | 2 BITS<br>11 | NO | THREE PERIODS |
| IMAGE | 6 BITS<br>111011 | 32 BITS | 6 BITS<br>100110 | NO | IDENTIFIES BITS IN HEADER |
| VIDEO | 8 BITS<br>01011000 | 64 BITS | 4 BITS<br>1010 | YES | SEQUENCE SHIFTS |
| • | • | • | • | • | • |
| • | • | • | • | • | • |
| • | • | • | • | • | • |

TABLE 350

METHOD AND APPARATUS OF NETWORK ARTIFACT INDENTIFICATION AND EXTRACTION

FIELD OF TECHNOLOGY

This disclosure relates generally to an enterprise method, a technical field of software, hardware and/or networking technology, and in one example embodiment, to a method, system and apparatus of network artifact identification and extraction.

BACKGROUND

An entity may not allow users to transmit/receive an artifact (e.g., Microsoft Word® document, digital photograph, etc.) having an unauthorized information (e.g., a trade secret, etc.) in an electronic transmission (e.g., e-mail, instant message, etc.) to a destination in a network that is not controlled by the entity. For example, the entity may prohibit the transmission/reception of a file with a digital photographic image based solely on the content of that image (e.g., an offensive image).

It may be difficult for the entity to obtain evidence that a particular user has transmitted/received a prohibited type of information unless the entity has an opportunity to visually examine a content of the artifact. The entity may employ several methods to obtain evidence that the particular user has transmitted/received a prohibited type of information. For example, the entity may reconfigure an electronic mail setting of the particular user's electronic mail application to forward all electronic mail to a supervisor employed by the entity. However, the particular user may transmit information at a greater frequency and/or at different times (e.g., at night) than can be monitored by the supervisor. The methods employed by the entity may be inefficient and/or incomplete.

Furthermore, they may require considerable expenditures of financial, network band width and/or supervisor work time to implement.

SUMMARY

A method, system, and apparatus of network artifact identification and extraction are disclosed. In one aspect, a method includes aggregating a payload data (e.g., may be a component of the extracted artifact) from different network packets to form an aggregated payload data, matching the payload data with an entry of a library of known artifacts, determining a type of the payload data based on a match with the entry of the library of known artifacts, separating the payload data from a header data in a network packet, and communicating the aggregated payload data as an extracted artifact (e.g., may be a word processing document, a spreadsheet document, a database, an image, a video, a multimedia file, an email, an instant message communication, an audio file, a compressed file, an executable file, a web page, a presentation, etc.) to a user.

The method may include using the extracted artifact to perform network visibility analysis of users on packets flowing across the network. The method may also include validating that the entry is accurate by performing a deeper analysis of the payload data with the entry of the library of known artifacts. The method may determine that the payload data is encrypted. The method may apply an encrypted data processing module of a network appliance to generate a request for the encrypted data from a source on behalf of a requester. The method may receive a decryption key from a source of the encrypted data. The method may decrypt the encrypted data on the network appliance using the decryption key. The method may determine the type of the encrypted data based on the decryption.

The method may include determining that the artifact is incomplete through an examination of a file structure with a known file specification. The method may communicate a portion of the incomplete artifact to the user. The method may also include forming the library of known artifacts by identifying markers (e.g., may be start bits of the artifact, payload length of the artifact, a set of ending bits, and/or other identification bits found in each instance of the artifact) found in data files stored in each instance of a particular type of artifact.

In another aspect, a system includes a packet rearrange module to reorder a network packet and other network packets based on a sequence number of each of the network packet and other network packets, a packet analyzer module to separate a payload data (e.g., may be a component of the extracted artifact) from a header data in the network packet, an identification module to match the payload data with an entry of a library of known artifacts, a validation module to verify that the entry is accurate by performing a deeper analysis of the payload data with the entry of the library of known artifacts, a type module determine a type of the payload data based on a match with the entry in the library of known artifacts, a presentation module to aggregate the payload data from different network packets to form an aggregated payload data, and an extraction module to communicate the aggregated payload data as an extracted artifact (e.g., may be a word processing document, a spreadsheet document, a database, an image, a video, a multimedia file, an email, an instant message communication, an audio file, a compressed file, an executable file, a web page, a presentation, etc.) to a user.

The system may include a network visibility module to perform network visibility analysis users on packets flowing across the network using the extracted artifact. The system may include a determination module to determine that the payload data is encrypted. The method may include encrypted data processing module to generate a request for the encrypted data from a source on behalf of a requestor and/or to receive a decryption key on a network appliance. The method may include a decryption module to apply the decryption key to decrypt the encrypted data on the network appliance.

The system may include an incomplete management module to determine that the artifact is incomplete, and/or to communicate a portion of the incomplete artifact to the user. The system may include a library formation module to create the library of known artifacts by identifying markers (e.g., may be start bits of the artifact, payload length of the artifact, a set of ending bits, and/or other identification bits found in each instance of the artifact) found in data files stored in each instance of a particular type of artifact.

In yet another aspect, the method includes forming a library of known artifacts by identifying markers (e.g., may be start bits of the artifact, payload length of the artifact, a set of ending bits, and/or other identification bits found in each instance of the artifact) found in data files stored in each instance of a particular type of artifact, identifying at least one marker in a packet transmitted through a network based on a match with the library, determining a type of a file associated with the packet based on the at least one marker, aggregating relevant portions of the packet with other packets associated having the at least one marker to extract the file from the network, and using the extracted file (e.g., may be a word processing document, a spreadsheet document, a database, an image, a video, a multimedia file, an email, an instant message communication, an audio file, a compressed file, an executable file, a web page, a presentation, etc.) to perform network visibility analysis of users on data files flowing across the network.

The method may include communicating the extracted file to a user after reordering the packet and/or the other packets based on sequence numbers of each packet. The method may include determining that the packet is encrypted. The method may apply an encrypted data processing module of a network appliance to generate a request for the encrypted data from a source on behalf of a requester. The method may receive a decryption key on the network appliance. The method may decrypt the packet on the network appliance using the decryption key. The method may determine the type of an encrypted file based on decrypted data.

The method may also include determining that the extracted file is incomplete. The method may communicate a portion of the extracted file that is incomplete to the user.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of network artifact identification and extraction are disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
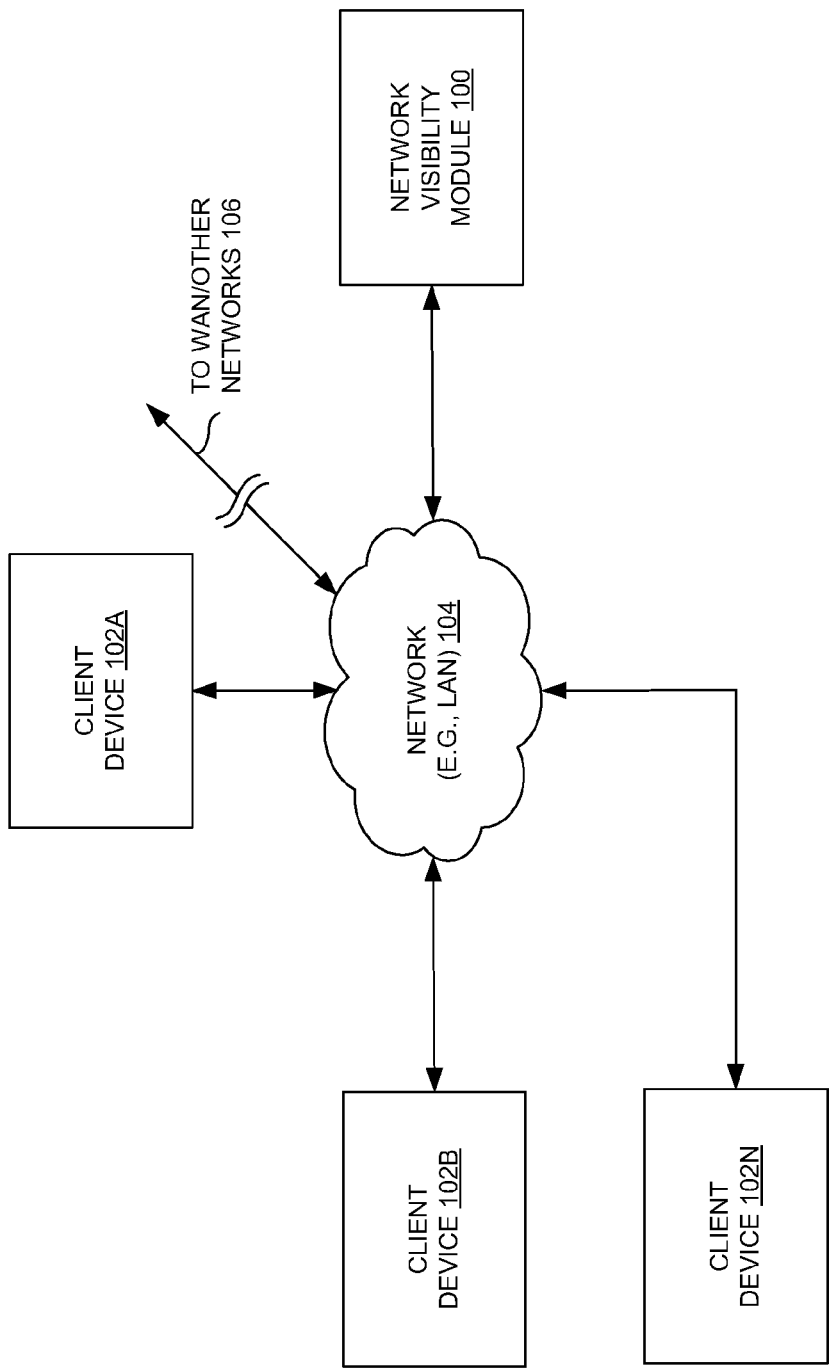
FIG. 1 is a system view of data communication in a network managed by the network visibility module, according to one embodiment.

In one embodiment, a method includes aggregating a payload data (e.g., the payload data 406 of FIG. 4) (e.g., may be a component of the extracted artifact) from different network packets to form an aggregated payload data (e.g., the aggregated payload data 500 of FIG. 5), matching the payload data 406 with an entry of a library of known artifacts (e.g., the library of known artifacts 222 of FIG. 2), determining (e.g., using the type module 214 of FIG. 2) a type of the payload data 406 based on a match with the entry of the library of known artifacts 222, separating (e.g., using the packet analyzer module 202 of FIG. 2) the payload data 406 from a header data in a network packet, and communicating (e.g., using the extraction module 210 of FIG. 2) the aggregated payload data 500 as an extracted artifact (e.g., the artifact 504 of FIG. 4) (e.g., may be a word processing document, a spreadsheet document, a database, an image, a video, a multimedia file, an email, an instant message communication, an audio file, a compressed file, an executable file, a web page, a presentation, etc.) to a user (e.g., may be to the client device 102A-N of FIG. 1).

In another embodiment, a system includes a packet rearrange module (e.g., the packet rearrange module 226 of FIG. 2) to reorder a network packet and other network packets based on a sequence number of each of the network packet and other network packets, a packet analyzer module (e.g., the packet analyzer module 202 of FIG. 2) to separate a payload data (e.g., the payload data 406 of FIG. 4) (e.g., may be a component of the extracted artifact) from a header data in the network packet, an identification module (e.g., the identification module 208 of FIG. 2) to match the payload data with an entry of a library of known artifacts, a validation module (e.g., the validation module 206 of FIG. 2) to verify that the entry is accurate by performing a deeper analysis of the payload data 406 with the entry of the library of known artifacts 222, a type module (e.g., the type module 214 of FIG. 2) determine a type of the payload data 406 based on a match with the entry in the library of known artifacts 222, a presentation module (e.g., the presentation module 212 of FIG. 2) to aggregate the payload data 406 from different network packets to form an aggregated payload data 500, and an extraction module (e.g., the extraction module 210 of FIG. 2) to communicate the aggregated payload data 500 as an extracted artifact (e.g., may be a word processing document, a spreadsheet document, a database, an image, a video, a multimedia file, an email, an instant message communication, an audio file, a compressed file, an executable file, a web page, a presentation, etc.) to a user (e.g., may be to the client device 102A-N of FIG. 1).

In yet another embodiment, the method includes forming (e.g., using the library formation module 224 of FIG. 2) a library of known artifacts (e.g., a library of known artifacts 222 of FIG. 2) by identifying markers (e.g., may be start bits of the artifact, payload length of the artifact 504, a set of ending bits, and/or other identification bits found in each instance of the artifact) found in data files stored in each instance of a particular type of artifact 504, identifying (e.g., using the identification module 208 of FIG. 2) marker in a packet (e.g., the packet 450 of FIG. 4) transmitted through a network (e.g., the network 104 of FIG. 1) based on a match with the library, determining (e.g., using the type module 214 of FIG. 2) a type of a file associated with the packet 450 based on the marker, aggregating (e.g., using the presentation module 212 of FIG. 2) relevant portions of the packet 450 with other packets associated having the marker to extract the file from the network 104, and using the extracted file (e.g., may be a word processing document, a spreadsheet document, a database, an image, a video, a multimedia file, an email, an instant message communication, an audio file, a compressed file, an executable file, a web page, a presentation, etc.) to perform network visibility analysis (e.g., using the network visibility module 100 of FIG. 1) of users on data files flowing across the network 104.

FIG. 1 is a system view of data communication in a network 104 managed by a network visibility module 100, according to one embodiment. Particularly, FIG. 1 illustrates a network visibility module 100, client device 102A-N, a network 104, and WAN/other networks 106, according to one embodiment.

The network visibility module 100 may perform network visibility analysis (e.g., may be a way of modeling what users communicate on the internet in an organization) of users (e.g., may be employees) on packet 450 flowing across the network 104 using the extracted artifact.

The client device 102A-N may be a data processing system (e.g., a computer, mobile devices, laptop, etc.) in the network that may communicate (e.g., transfer data, receive data, browse, etc.) with outside world. The network 104 (e.g., LAN, WAN, mobile, telecommunications, internet, intranet, WiFi and/or ZigBee network, etc.) may enable communication between the client device 102A-N and with external networks (e.g., WAN, internet, etc.). The WAN/other networks 106 may be a geographically dispersed (e.g., world wide) telecommunications network (e.g., internet) which may enable the client device 102A-N to communicate with the external world.

In example embodiment, FIG. 1 illustrates the client device 102A-N in a network 104 communicating with the other network (e.g., WAN/other network 106) that may be managed by the network visibility module 100.

In one embodiment, the network visibility module 100 may perform network visibility analysis of the users on packets (e.g., the packet 450 of FIG. 4) flowing across the network 104 using the extracted artifact 504.

Figure 2:
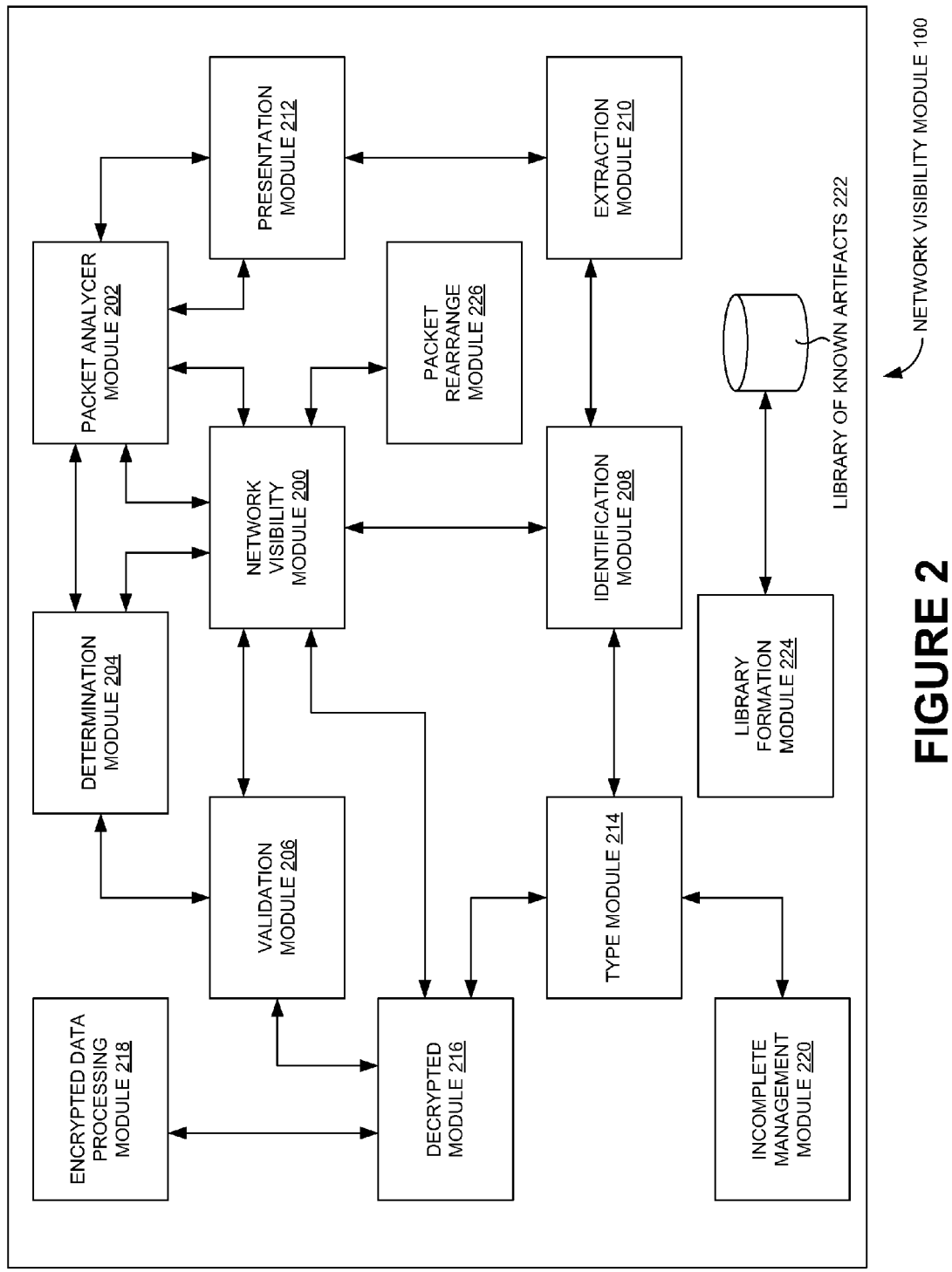
FIG. 2 is an exploded view of the network visibility module, according to one embodiment.

FIG. 2 is an exploded view of the network visibility module, according to one embodiment. Particularly, FIG. 2 illustrates a network visibility module 200, a packet analyzer module 202, a determination module 204, a validation module 206, identification module 208, extraction module 210, a presentation module 212, a type module 214, a decryption module 216, an encrypted data processing module 218, an incomplete management module 220, a library of known artifacts 222, a library formation module 224, and a packet rearrange module 226, according to one embodiment.

The network visibility module 200 may perform network visibility analysis (e.g., verify, check) of users on packets flowing across the network using the extracted artifact. The packet analyzer module 202 may separate the payload data 506A-N (e.g., that may contain artifact component) from the header data (e.g., that may contain information associated to the payload and other details) in the network packet. The determination module 204 may determine (e.g., verify, validate) that the payload data 506A-N is encrypted. The validation module 206 may verify that the entry (e.g., entry of the library of known artifacts 222) is accurate by performing a deeper analysis of the payload data 506A-N with the entry of the library of known artifacts.

The identification module 208 may match the payload data 506A-N with an entry of a library of known artifacts 222. The extraction module 210 may communicate (e.g., transfer) the aggregated payload data 500 as an extracted artifact (e.g., the spreadsheet, etc.) to a user (e.g., may be a client device 102A-N). The presentation module 212 to aggregate the payload data 406 (e.g., which may have different artifacts components) from different network packets to form an aggregated payload data 500. The type module 214 may determine a type of the payload data 406 based on a match with the entry in the library of known artifacts 222. The decryption module 216 may apply the decryption key (e.g., a right code) to decrypt the encrypted data on the network appliance.

The encrypted data processing module 218 may generate a request for the encrypted data (e.g., in the payload 404) from a source on behalf of a requestor and/or to receive a decryption key on a network appliance. The incomplete management module 220 may determine that the artifact (e.g., that may contain the data) is incomplete, and/or may communicate (e.g., transmit) a portion of the incomplete artifact to the user (e.g., to the client device). The library of known artifacts 222 may be a database that may have all the information about the various artifacts that may possibly used by the client device 102A-N. The library formation module 224 may create the library of known artifacts 222 by identifying markers found in data files (e.g., such as spreadsheet file, audio file, image, etc.) stored in each instance of a particular type of artifact.

The packet rearrange module 226 may reorder a network packet and other network packets based on a sequence number (e.g., may be chronological order) of each of the network packet and other network packets.

In example embodiment, the network visibility module may communicate with the packet analyzer module 202, the determination module 204, the validation module 206, the identification module 208 and the decryption module 216. The determination module may communicate with the validation module 206. The packet analyzer module may communicate with the presentation module 212. The presentation module 212 may communicate with the extraction module 210. The extraction module may communicate with the identification module 208. The identification module 208 may communicate with the library formation module 224 and the type module 214. The type module 214 may communicate with the incomplete management module 220 and the decryption module 216. The decryption module may communicate with the encrypted data processing module 218. The packet rearrange module 226 may communicate with the network visibility module 200, according to one embodiment.

In one embodiment, the payload data 406 from different network packets may be aggregated (e.g., using the presentation module 212 of FIG. 2) to form the aggregated payload data 500. The payload data may be matched (e.g., using the identification module 208 of FIG. 2) with an entry of a library of known artifacts (e.g., the library of known artifacts 222 of FIG. 2). The type of the payload data 406 may be determined (e.g., using the type module 214 of FIG. 2) based on a match with the entry of the library of known artifacts 222.

The payload data 406 may be separated (e.g., using the packet analyzer module 202 of FIG. 2) from a header data in a network packet. The aggregated payload data 500 may be communicated (e.g., using the extraction module 210 of FIG. 2) as an extracted artifact (e.g., the artifact 504 of FIG. 5) to a user (e.g., may be to the client device 102A-N of FIG. 1). The extracted artifact 504 may be used to perform network visibility analysis (e.g., using the network visibility module 200 of FIG. 2) of users on packets (e.g., the packet 450 of FIG. 4) flowing across a network (e.g., the network 104 of FIG. 1). It may be validated (e.g., using the validation module 206 of FIG. 2) that the entry is accurate by performing a deeper analysis of the payload data 406 with the entry of the library of known artifacts 222.

It may be determined (e.g., using the determination module 204 of FIG. 2) that the payload data is encrypted (e.g., may be by analyzing the meta-data). The encrypted data processing module (e.g., the encrypted data processing module 218 of FIG. 2) of a network appliance may be applied to generate a request for the encrypted data from a source on behalf of a requestor (e.g., may be the client device 102A-N). The decryption key may be received (e.g., using the encrypted data processing module 218 of FIG. 2) from a source of the encrypted data. The encrypted data on the network appliance may be decrypted (e.g., using the decryption module 216 of FIG. 2) using the decryption key.

The type of the encrypted data may be determined based on the decryption. It may be determined (e.g., using the incomplete management module 220 of FIG. 2) that the artifact 504 is incomplete through an examination of a file structure with a known file specification. A portion of the incomplete artifact may be communicated (e.g., using the incomplete management module 220 of FIG. 2) to the user. The packet rearrange module 226 may reorder a network packet and/or other network packets based on a sequence number of each of the network packet and/o other network packets. The packet analyzer module 202 may separate a payload data (e.g., the payload data 406 of FIG. 4) from a header data in the network packet.

The identification module 208 may match the payload data 406 with an entry of the library of known artifacts 222. The validation module 206 may verify that the entry is accurate by performing a deeper analysis of the payload data 406 with the entry of the library of known artifacts 222. The type module 214 may determine a type of the payload data 406 based on a match with the entry in the library of known artifacts 222. The presentation module 212 may aggregate the payload data 406 from different network packets to form an aggregated payload data 500. The extraction module 210 may communicate the aggregated payload data 500 as an extracted artifact 504 to a user.

The determination module 204 may determine that the payload data 406 is encrypted. The encrypted data processing module 218 may generate a request for the encrypted data from a source on behalf of a requester and/or may receive a decryption key on a network appliance. The decryption module 216 may apply the decryption key to decrypt the encrypted data on the network appliance. The incomplete management module 220 may determine that the artifact is incomplete, and may communicate a portion of the incomplete artifact to the user. The library formation module 224 may create the library of known artifacts 222 by identifying markers found in data files stored in each instance of a particular type of artifact 504.

The library of known artifacts 222 may be formed (e.g., using the library formation module 224 of FIG. 2) by identifying markers found in data files stored in each instance of a particular type of artifact 504. The library of known artifacts 222 may be formed (e.g., using the library formation module 224 of FIG. 2) by identifying markers found in data files stored in each instance of a particular type of artifact 504. The marker in a packet (e.g., the packet 450 of FIG. 4) transmitted through a network (e.g., the network 104 of FIG. 1) may be identified (e.g., using the identification module 208 of FIG. 2) based on a match with the library.

A type of a file associated with the packet 450 may be determined (e.g., using the type module 214 of FIG. 2) based on the marker. Relevant portions of the packet 450 may be aggregated (e.g., using the presentation module 212 of FIG. 2) with other packets associated having the marker to extract the file from the network 104. The extracted file may be used to perform network visibility analysis (e.g., using the network visibility module 100 of FIG. 1) of a plurality of users on data files flowing across the network.104.

The extracted file may be communicated (e.g., using the extraction module 210 of FIG. 2) to a user (e.g., may be to the client device 102A-N of FIG. 1) after reordering the packet 450 and the other packets based on sequence numbers (e.g., may be chronologically sequenced) of each packet 450. It may be determining (e.g., using the determination module 204 of FIG. 2) that the packet 459 is encrypted. An encrypted data processing module (e.g., the encrypted data processing module 218 of FIG. 2) of a network appliance may be applied to generate a request for the encrypted data from a source on behalf of a requestor (e.g., may be the client device 102A-N of FIG. 1). The decryption key may be received (e.g., the encrypted data processing module 218 of FIG. 2) on the network appliance.

The packet 450 on the network 104 appliance may be decrypted (e.g., using the decryption module 216 of FIG. 2) using the decryption key. The type of an encrypted file may be determined (e.g., by analyzing the meta-data content of the header 402) based on decrypted data. It may be determined (e.g., using the incomplete management module 220 of FIG. 2) that the extracted file (e.g., word file, excel file, open office file, etc.) is incomplete. A portion of the extracted file that is incomplete may be communicated (e.g., using the incomplete management module 220 of FIG. 2) to the user (e.g., to the client device 102A-N).

Figure 3:
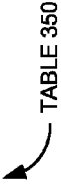
FIG. 3 is a table view illustrating the information (e.g., start bits, length, etc.) in a packet, according to one embodiment.

FIG. 3 is a table view illustrating the information (e.g., start bits, length, etc.) in a packet, according to one embodiment. Particularly, FIG. 3 illustrates an artifact field 302, start bits field 304, length field 306, end bits field 308, encrypted field 310 and other field 312, according to one embodiment.

The artifact field 302 may illustrate the type of artifacts in the payload data 406. The start bits field 304 may illustrate a first state that indicates start of a sequence of data block bits. The length field 306 may illustrate the length of the payload 404. The end bits field 308 may illustrate the end bits that may mark the end of the packet and/or preamble bit for the subsequent packet. The encrypted field 310 may illustrate whether the payload data is encrypted or not. The other field 312 may illustrate the other information associated to the artifacts.

In example embodiment, FIG. 3 illustrates table view 350. The artifact field 302 may illustrate "word processing document" in first row, "spreadsheet file" in second row, "image" in third row, and "video" in fourth row. The start bits filed 304 may illustrate "4 bits as 1011" in first row, "3 bits as 110" in second row, "6 bits as 111011" in third row, and "8 bits as 01011000" in fourth row. The length field 306 may illustrate "16 bits" in the first row, "24 bits" in the second row, "32 bits" in the third row, and "64 bits" in the fourth row. The end bits field 308 may illustrate "4 bits as 1001" in the first row, "2 bits as 11" in the second row, "6 bits as 100110" in the third row, and "4 bits as 1010" in the fourth row. The encrypted field 318 may illustrate "yes" in the first row, "no" in the second row, "no" in the third row, and "yes" in the fourth row. The other field 312 may illustrate "repeats every two intervals" in the first row, "three periods" in the second row, "identifier bits in header" in the third row, and "sequence shifts" in the fourth row.

Figure 4:
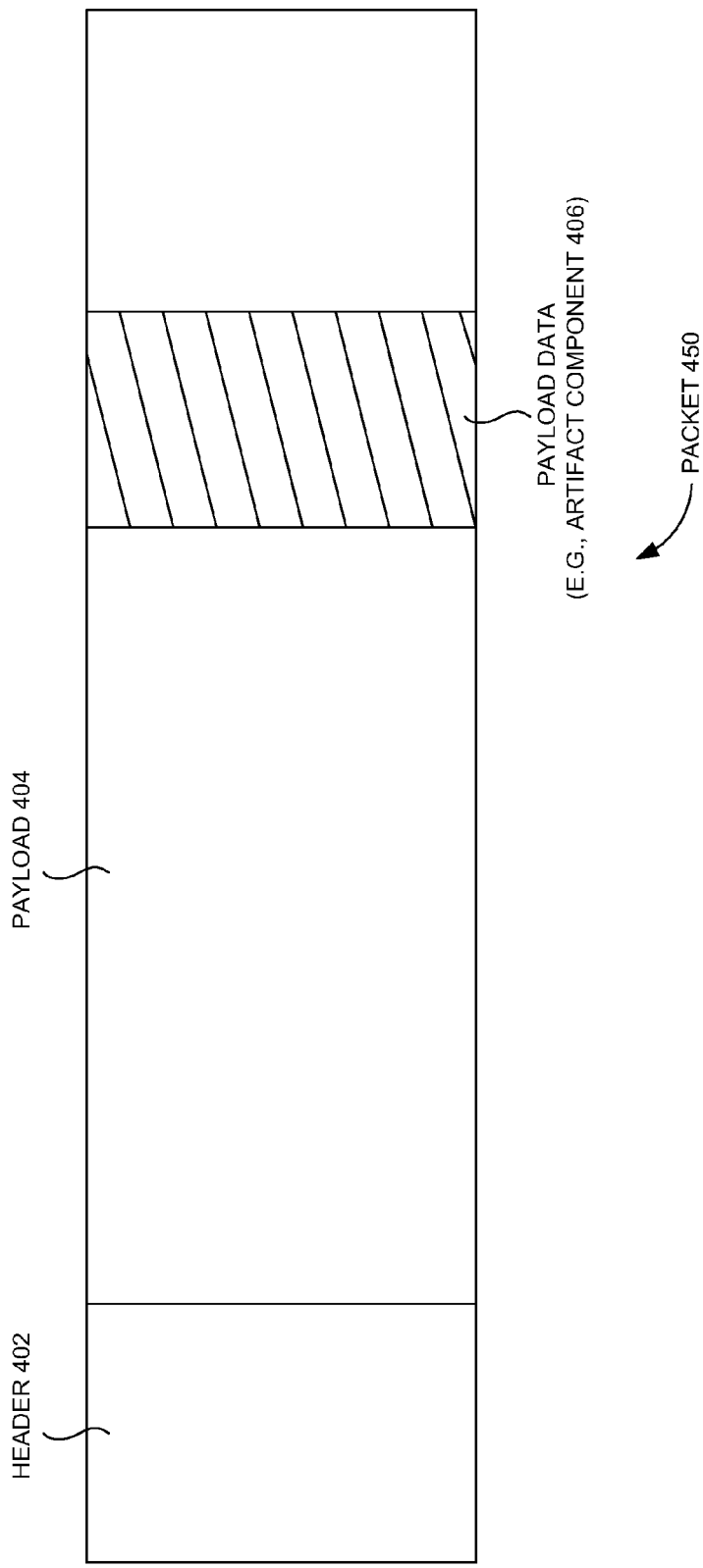
FIG. 4 is a structural view of a packet, according to one embodiment.

FIG. 4 is a structural view of a packet 450, according to one embodiment. Particularly, FIG. 4 illustrates a header 402, a payload 404, and a payload data 406, according to one embodiment.

The header 402 may have instructions (e.g., length of packet, packet number, synchronization, protocol, destination address, originating address, meta-data, etc.) associated to the data carried by the packet 450. The payload 404 may be a part of the packet 450 that carries actual data. The payload data 406 may contain the data (e.g., the artifact component) described by the next header field.

In example embodiment, FIG. 4 illustrates the structure if the packet 450 that may include the header 402, the payload 404, and the payload data 406. The header 402 may contain all the necessary information associated to the packet 450. The payload may be a part of the packet 450 which may contain data (e.g., artifact, etc.) and other information associated to the data. The payload data 406 may have the actual artifact and information that would have been described in the header 402.

In one embodiment, the payload data 406 may be a component of the extracted artifact 504. The markers may include start bits of the artifact 504, payload length of the artifact 504, a set of ending bits, and/or other identification bits found in each instance of the artifact 504.

Figure 5:
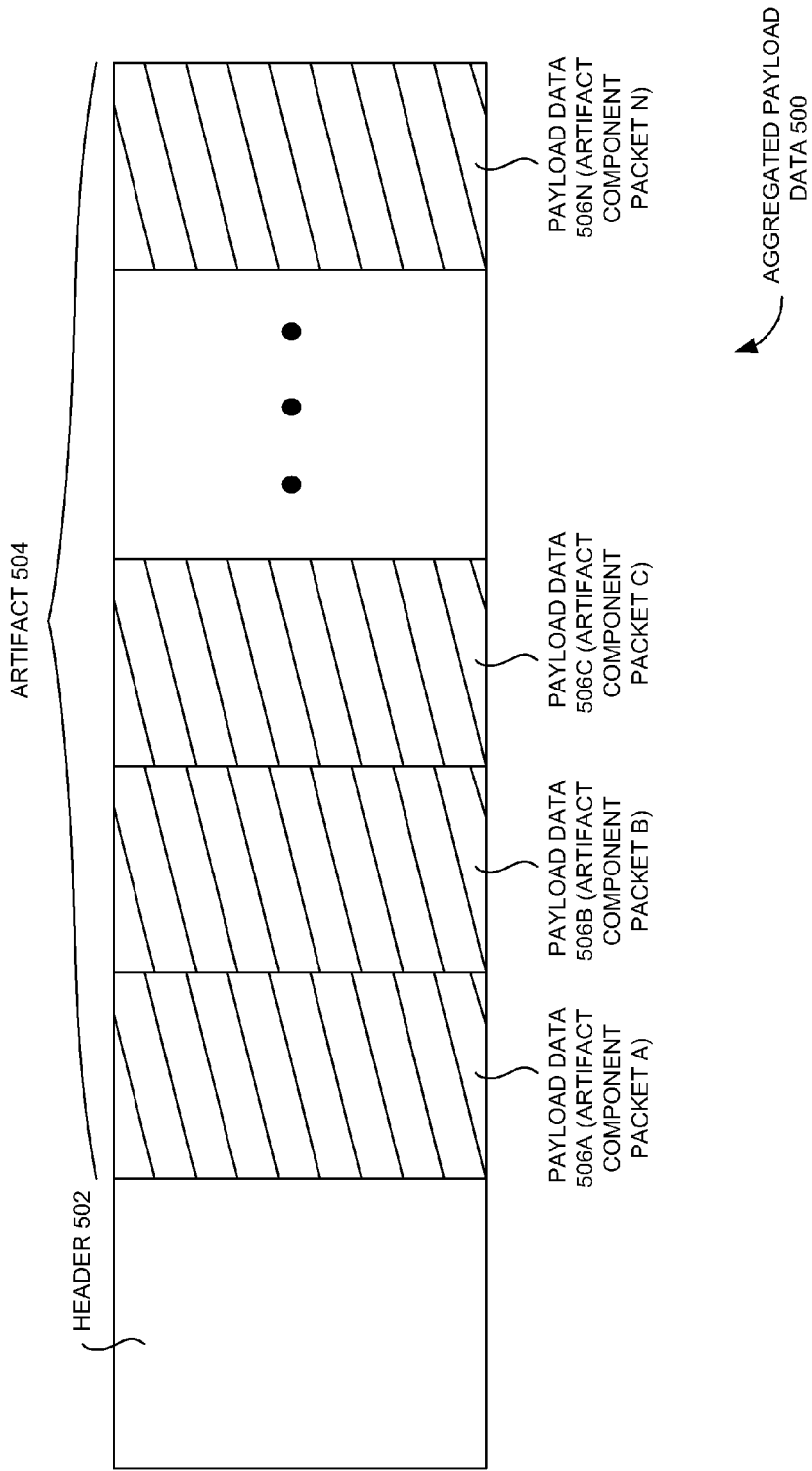
FIG. 5 is a structural view of an aggregated payload data, according to one embodiment.

FIG. 5 is a structural view of an aggregated payload data, according to one embodiment. Particularly, FIG. 5 illustrates an aggregated payload data 500, a header 502, an artifact 504, and payload data 506A-N, according to one embodiment.

The aggregated payload data 500 may be a collection of payload data that may be aggregated form the network packets. The header 502 may include information associated to the aggregated payload data 500 along with the other data (e.g., sequence number, packet length, etc.). The artifact 504 may be a data chunk (e.g., packets of data of an email, an instant message communication, an audio file, a compressed file, etc.) that may be carried by the packet that flows in the network. The payload data 506A-N may be a collection of payload data (e.g., that may include a word processing document, a spreadsheet document, a database, an image, a video, a multimedia file, an email, an instant message communication, an audio file, a compressed file, an executable file, a web page, a presentation, etc.) that may be aggregated form the network packets.

In example embodiment, FIG. 5 illustrates the aggregated payload data 500 that may be generated by collection of different payloads aggregated from the network packets. The aggregated payload data 500 may include a header 502 and the artifact 504. The header 502 may contain information associated to the aggregated payload data 500 and the other data (e.g., such as length of payload, content, etc.)

In one embodiment, the extracted artifact 504 may be a word processing document, a spreadsheet document, a database, an image, a video, a multimedia file, an email, an instant message communication, an audio file, a compressed file, an executable file, a web page, a presentation, etc.

Figure 6:
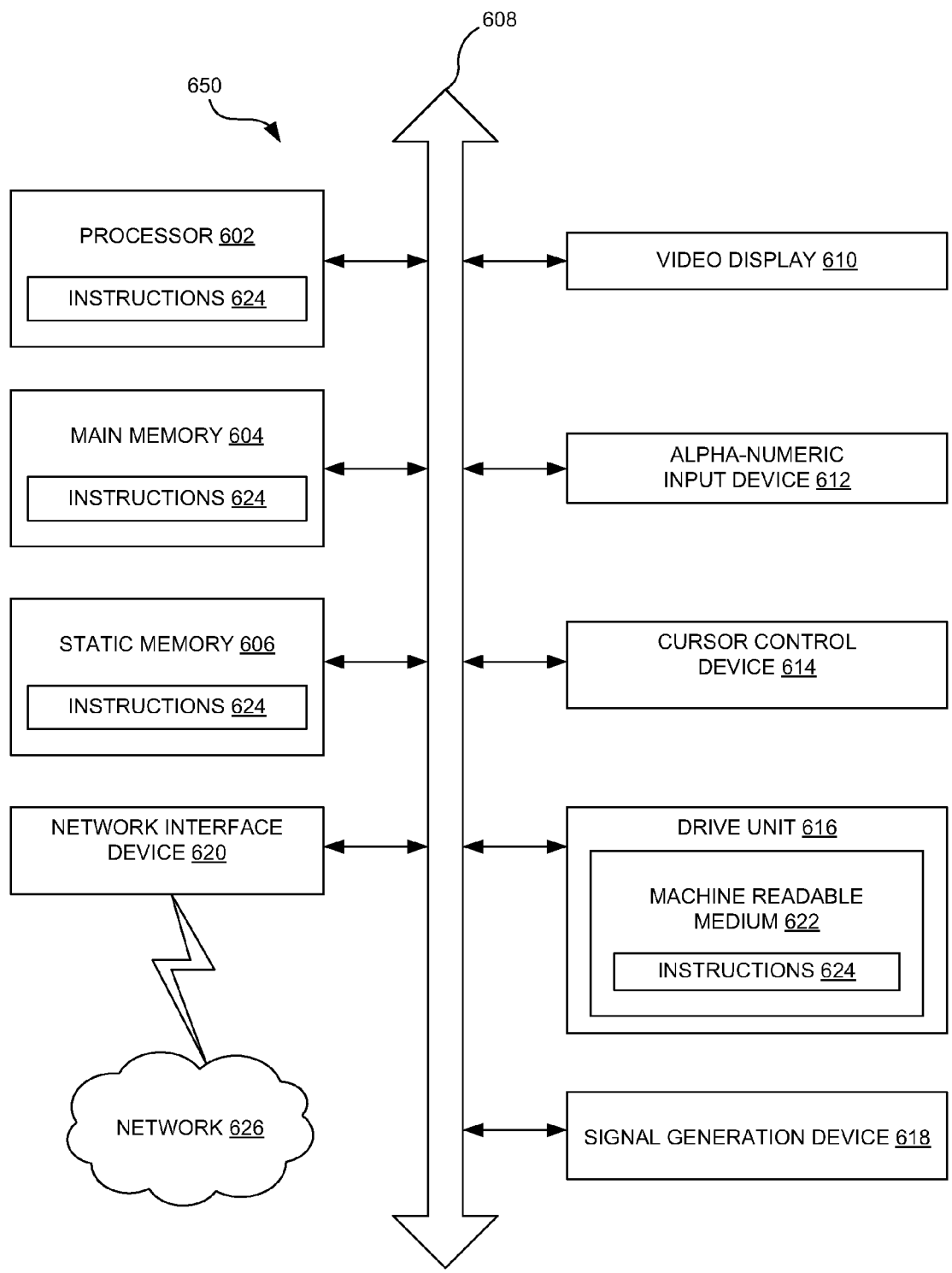
FIG. 6 is a diagrammatic system view of a data processing system in which any of the embodiments disclosed herein may be performed, according to one embodiment.

FIG. 6 is a diagrammatic system view of a data processing system in which any of the embodiments disclosed herein may be performed, according to one embodiment. Particularly, the diagrammatic system view 600 of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624, and a network 626, according to one embodiment.

The diagrammatic system view 600 may indicate a personal computer and/or the data processing system in which one or more operations disclosed herein are performed. The processor 602 may be a microprocessor, a state machine, an application specific integrated circuit, a field programmable gate array, etc. (e.g., Intel® Pentium® processor). The main memory 604 may be a dynamic random access memory and/or a primary memory of a computer system.

The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, a keyboard and/or any other input device of text (e.g., a special device to aid the physically handicapped).

The cursor control device 614 may be a pointing device such as a mouse. The drive unit 616 may be the hard drive, a storage system, and/or other longer term storage subsystem. The signal generation device 618 may be a bios and/or a functional operating system of the data processing system. The network interface device 620 may be a device that performs interface functions such as code conversion, protocol conversion and/or buffering required for communication to and from the network 626. The machine readable medium 622 may provide instructions on which any of the methods disclosed herein may be performed. The instructions 624 may provide source code and/or data code to the processor 602 to enable any one or more operations disclosed herein.

Figure 7A:
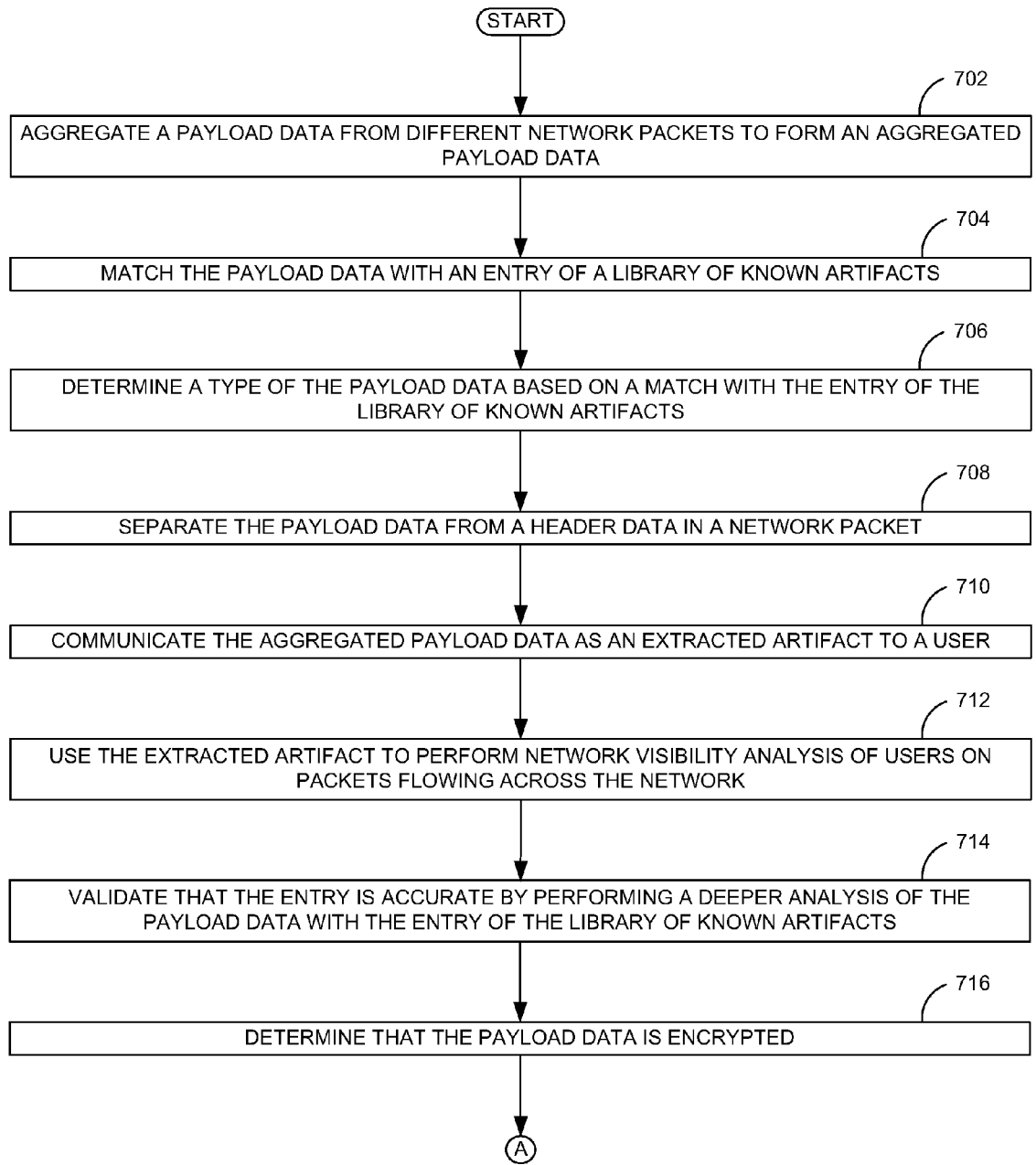
FIG. 7A is a process flow of aggregating a payload data from different network packets to form a aggregated payload data, according to one embodiment.

FIG. 7A is a process flow of aggregating a payload data (e.g., the payload data 406 of FIG. 4) from different network packets to form an aggregated payload data (e.g., the aggregated payload data 500 of FIG. 5), according to one embodiment. In operation 702, the payload data 406 from different network packets may be aggregated (e.g., using the presentation module 212 of FIG. 2) to form the aggregated payload data 500. In operation 704, the payload data may be matched (e.g., using the identification module 208 of FIG. 2) with an entry of a library of known artifacts (e.g., the library of known artifacts 222 of FIG. 2). In operation 706, a type of the payload data 406 may be determined (e.g., using the type module 214 of FIG. 2) based on a match with the entry of the library of known artifacts 222.

In operation 708, the payload data 406 may be separated (e.g., using the packet analyzer module 202 of FIG. 2) from a header data in a network packet. In operation 710, the aggregated payload data 500 may be communicated (e.g., using the extraction module 210 of FIG. 2) as an extracted artifact (e.g., the artifact 504 of FIG. 5) to a user (e.g., may be to the client device 102A-N of FIG. 1). In operation 712, the extracted artifact 504 may be used to perform network visibility analysis (e.g., using the network visibility module 200 of FIG. 2) of users on packets (e.g., the packet 450 of FIG. 4) flowing across a network (e.g., the network 104 of FIG. 1).

The extracted artifact 504 may be a word processing document, a spreadsheet document, a database, an image, a video, a multimedia file, an email, an instant message communication, an audio file, a compressed file, an executable file, a web page, a presentation, etc. In operation 714, it may be validated (e.g., using the validation module 206 of FIG. 2) that the entry is accurate by performing a deeper analysis of the payload data 406 with the entry of the library of known artifacts 222.

Figure 7B:
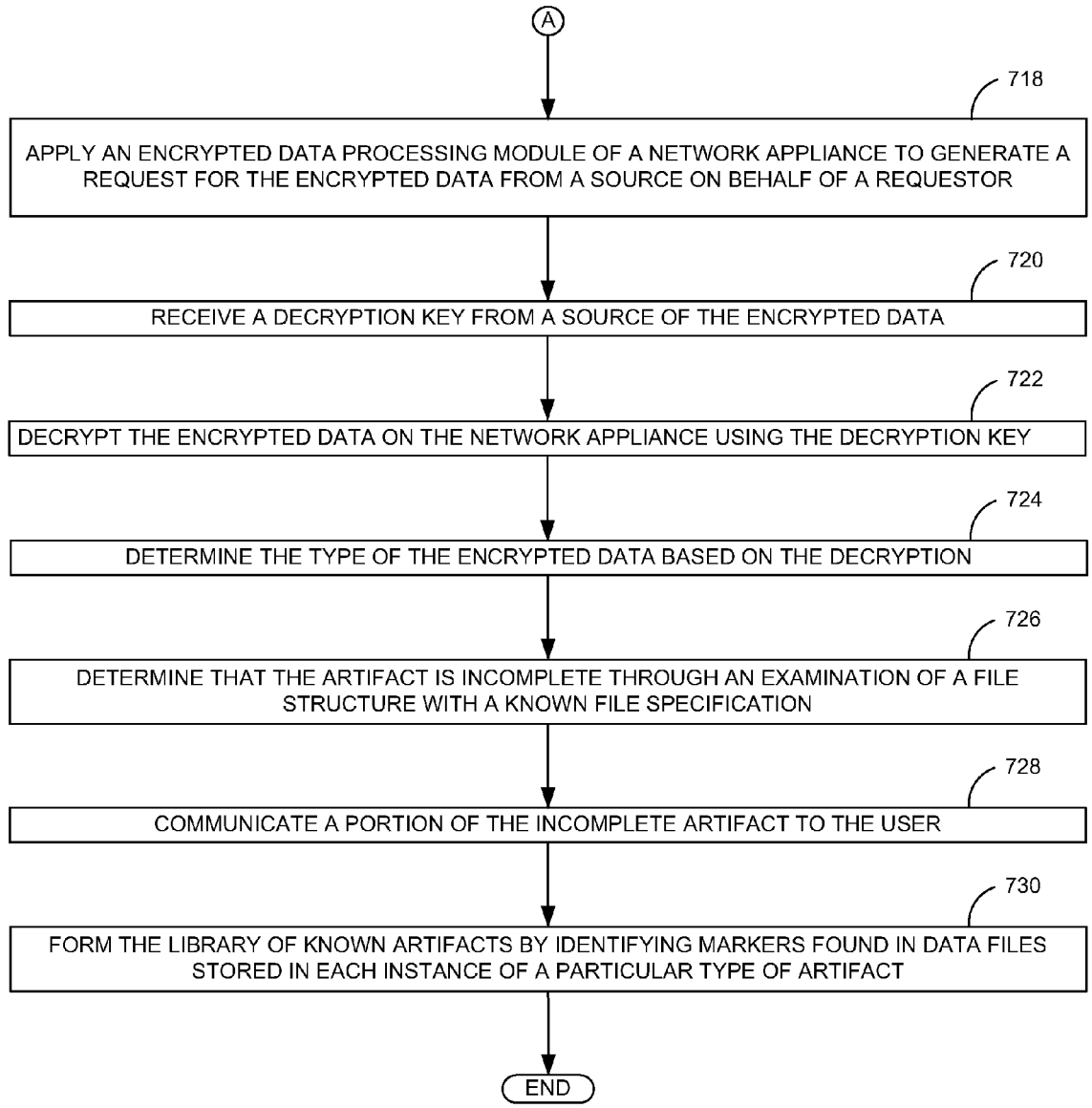
FIG. 7B is a continuation of process flow of FIG. 7A, illustrating additional operations, according to one embodiment.

FIG. 7B is a continuation of process flow of FIG. 7A, illustrating additional operations, according to one embodiment. In operation 716, it may be determined (e.g., using the determination module 204 of FIG. 2) that the payload data is encrypted (e.g., may be by analyzing the meta-data). In operation 718, an encrypted data processing module (e.g., the encrypted data processing module 218 of FIG. 2) of a network appliance may be applied to generate a request for the encrypted data from a source on behalf of a requestor (e.g., may be the client device 102A-N). In operation 720, a decryption key may be received (e.g., using the encrypted data processing module 218 of FIG. 2) from a source of the encrypted data. In operation 722, the encrypted data on the network appliance may be decrypted (e.g., using the decryption module 216 of FIG. 2) using the decryption key. In operation 724, the type of the encrypted data may be determined based on the decryption.

In operation 726, it may be determined (e.g., using the incomplete management module 220 of FIG. 2) that the artifact 504 is incomplete through an examination of a file structure with a known file specification. In operation 728, a portion of the incomplete artifact may be communicated (e.g., using the incomplete management module 220 of FIG. 2) to the user. In operation 730, the library of known artifacts 222 may be formed (e.g., using the library formation module 224 of FIG. 2) by identifying markers found in data files stored in each instance of a particular type of artifact 504.

The payload data 406 may be a component of the extracted artifact 504. The markers may include start bits of the artifact 504, payload length of the artifact 504, a set of ending bits, and/or other identification bits found in each instance of the artifact 504.

FIG. 8 is a process flow of forming a library of known artifacts (e.g., the library of known artifacts 222 of FIG. 2) by identifying markers found in data files stored in each instance of a particular type of artifact, according to one embodiment. In operation 802, the library of known artifacts 222 may be formed (e.g., using the library formation module 224 of FIG. 2) by identifying markers found in data files stored in each instance of a particular type of artifact 504. In operation 804, marker in a packet (e.g., the packet 450 of FIG. 4) transmitted through a network (e.g., the network 104 of FIG. 1) may be identified (e.g., using the identification module 208 of FIG. 2) based on a match with the library.

In operation 806, a type of a file associated with the packet 450 may be determined (e.g., using the type module 214 of FIG. 2) based on the marker. In operation 808, relevant portions of the packet 450 may be aggregated (e.g., using the presentation module 212 of FIG. 2) with other packets associated having the marker to extract the file from the network 104. In operation 810, the extracted file may be used to perform network visibility analysis (e.g., using the network visibility module 100 of FIG. 1) of a plurality of users on data files flowing across the network.104.

Figure 8A:
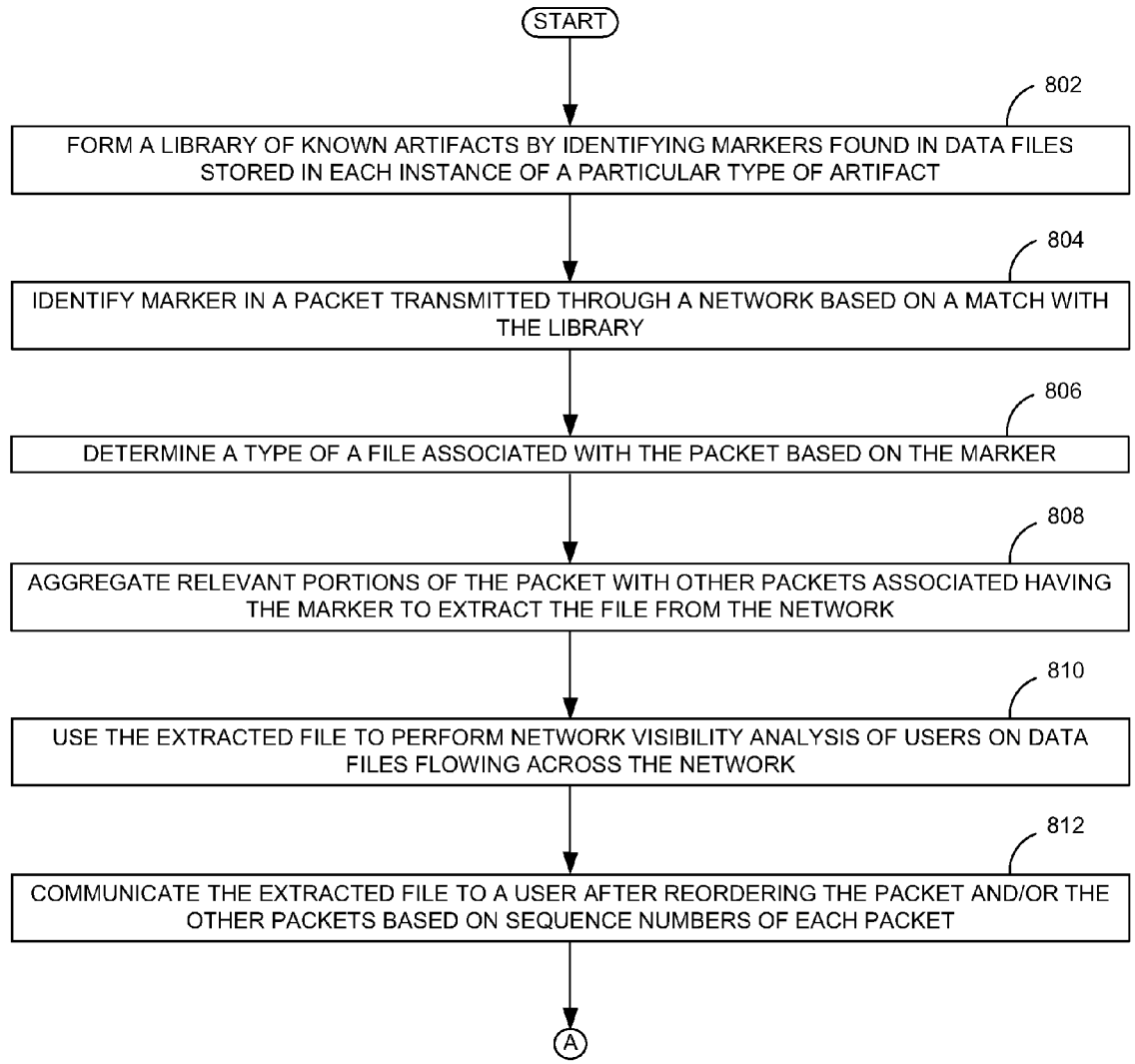
FIG. 8A is a process flow of forming a library of known artifacts by identifying markers found in data files stored in each instance of a particular type of artifact, according to one embodiment.
Figure 8B:
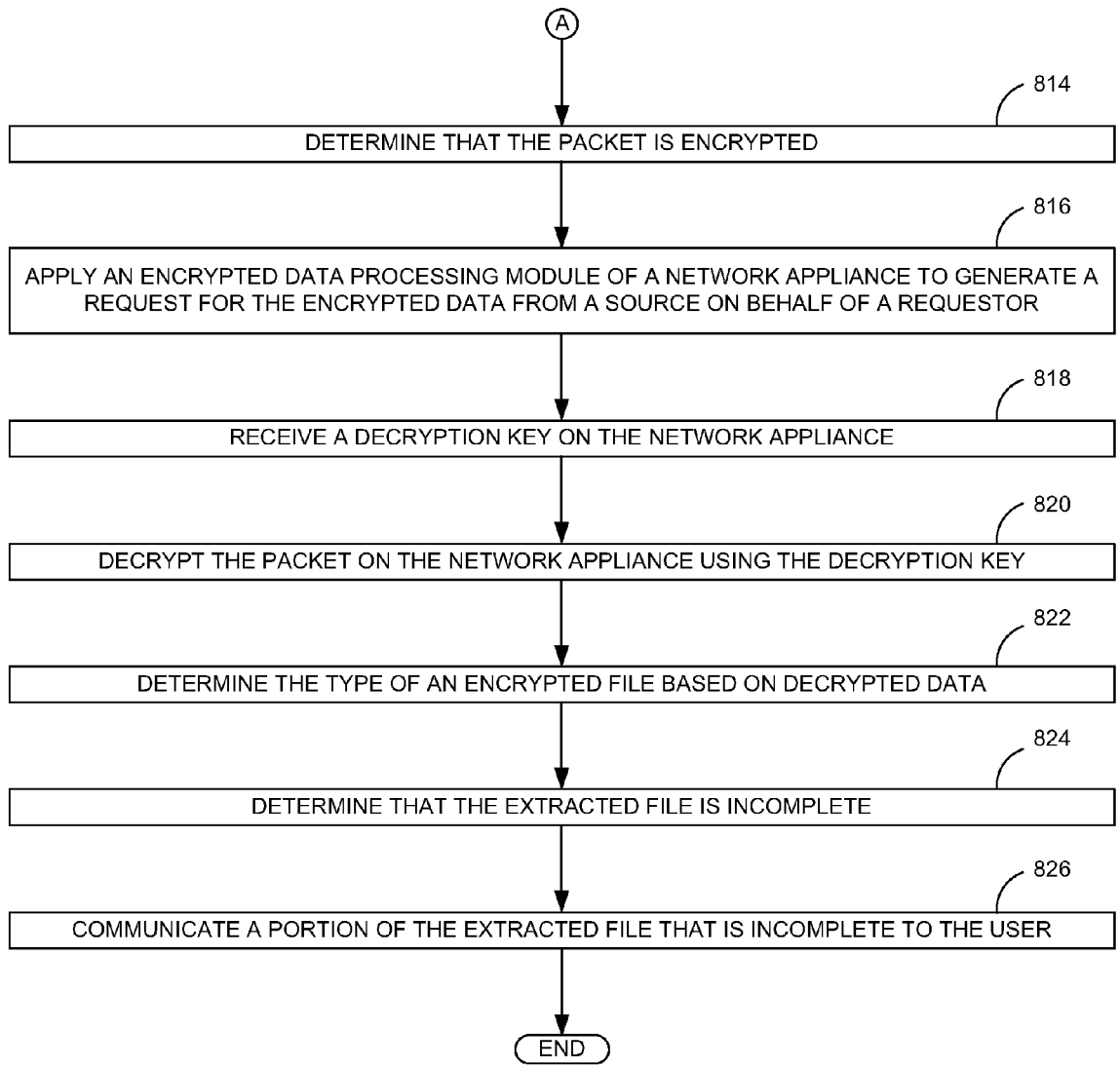
FIG. 8B is a continuation of process flow of FIG. 8A, illustrating additional operations, according to one embodiment.

FIG. 8B is a continuation of process flow of FIG. 8A, illustrating additional operations, according to one embodiment. In operation 812, the extracted file may be communicated (e.g., using the extraction module 210 of FIG. 2) to a user (e.g., may be to the client device 102A-N of FIG. 1) after reordering the packet 450 and the other packets based on sequence numbers (e.g., may be chronologically sequenced) of each packet 450. The extracted file may be a word processing document, a spreadsheet document, a database, an image, a video, a multimedia file, an email, an instant message communication, an audio file, a compressed file, an executable file, a web page, a presentation, etc.

In operation 814, it may be determining (e.g., using the determination module 204 of FIG. 2) that the packet 459 is encrypted. In operation 816, an encrypted data processing module (e.g., the encrypted data processing module 218 of FIG. 2) of a network appliance may be applied to generate a request for the encrypted data from a source on behalf of a requester (e.g., may be the client device 102A-N of FIG. 1). In operation 818, a decryption key may be received (e.g., the encrypted data processing module 218 of FIG. 2) on the network appliance. In operation 820, the packet 450 on the network 104 appliance may be decrypted (e.g., using the decryption module 216 of FIG. 2) using the decryption key.

In operation 822, the type of an encrypted file may be determined (e.g., by analyzing the meta-data content of the header 402) based on decrypted data. In operation 824, it may be determined (e.g., using the incomplete management module 220 of FIG. 2) that the extracted file (e.g., word file, excel file, open office file, etc.) is incomplete. In operation 826, a portion of the extracted file that is incomplete may be communicated (e.g., using the incomplete management module 220 of FIG. 2) to the user (e.g., to the client device 102A-N). The markers may include start bits of the artifact, payload length of the artifact 504, a set of ending bits, and/or other identification bits found in each instance of the artifact 504.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the network visibility module 100, the network visibility module 200, the packet analyzer module 202, the determination module 204, the validation module 206, identification module 208, extraction module 210, the presentation module 212, the type module 214, the decryption module 216, the encrypted data processing module 218, the incomplete management module 220, the library formation module 224, and the packet rearrange module 226 of FIGS. 1-8B may be enabled using software and/or using transistors, logic gates, and electrical circuits (e.g., application specific integrated ASIC circuitry) such as a network visibility circuit, a packet analyzer circuit, a determination circuit, a validation circuit, identification circuit, an extraction circuit, a presentation circuit, a type circuit, a decryption circuit, an encrypted data circuit, an incomplete management circuit, a library formation circuit, and a packet rearrange circuit and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A non-transitory machine readable medium, comprising:
  a packet rearrange module to reorder received network packets based upon sequence numbers;
  a packet analyzer module to separate payload data from header data in the received network packets;
  an identification module to perform a first match of the payload data with an entry from a library of known artifacts;
  a validation module to perform a second match of the payload data based upon a deeper analysis of the payload data with another entry from the library of known artifacts;

a library formation module to populate a table with characteristics of a packet of the received network packets;

an extraction module to communicate an extracted artifact to a user, wherein the extracted artifact is a file with aggregated payload data from a presentation module that includes reordered network packets based on sequence numbers of each packet from the packet rearrange module and wherein the file has an associated file type based on marker matches with the library of known artifacts;

an incomplete management module to identify an incomplete artifact through a comparison of the extracted artifact with a file structure with a known file specification; and a visibility module to perform network visibility analyses of the extracted artifact.

2. The non-transitory machine readable medium of claim 1 wherein each row of the table includes characteristics of a single network packet.

3. The non-transitory machine readable medium of claim 2 wherein the characteristics specify packet start bits.

4. The non-transitory machine readable medium of claim 2 wherein the characteristics specify packet length.

5. The non-transitory machine readable medium of claim 2 wherein the characteristics specify packet end bits.

6. The non-transitory machine readable medium of claim 2 wherein the characteristics specify an artifact type selected from a word processing document, a spreadsheet document, a database, an image, a video, a multimedia file, an email, an instant message communication, an audio file, a compressed file, an executable file, and a web page.

7. The non-transitory machine readable medium of claim 2 wherein the characteristics specify an encryption indicator.

8. The non-transitory machine readable medium of claim 1 further comprising:

a determination module to determine that the payload data is encrypted;

encrypted data processing module to generate a request for the encrypted data from a source and to receive a decryption key from the source;

a decryption module to apply the decryption key to decrypt the encrypted data.

* * * * *